(12) United States Patent
Wakabayashi

(10) Patent No.: US 10,477,113 B2
(45) Date of Patent: Nov. 12, 2019

(54) IMAGING DEVICE AND CONTROL METHOD THEREFOR

(71) Applicant: FUJIFILM Corporation, Tokyo (JP)

(72) Inventor: Satoru Wakabayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 15 days.

(21) Appl. No.: 15/981,380

(22) Filed: May 16, 2018

(65) Prior Publication Data

US 2018/0262691 A1    Sep. 13, 2018

Related U.S. Application Data

(63) Continuation of application No. PCT/JP2016/080302, filed on Oct. 13, 2016.

(30) Foreign Application Priority Data

Nov. 17, 2015  (JP) ................................ 2015-224739

(51) Int. Cl.
*H04N 5/232* (2006.01)
*G03B 17/14* (2006.01)
(Continued)

(52) U.S. Cl.
CPC ......... *H04N 5/23296* (2013.01); *G03B 13/02* (2013.01); *G03B 17/14* (2013.01);
(Continued)

(58) Field of Classification Search
CPC ......... H04N 5/23296; H04N 5/232939; H04N 5/232127; H04N 5/23245; H04N 5/23238;
(Continued)

(56) References Cited

U.S. PATENT DOCUMENTS

2007/0104474 A1* 5/2007 Tamura ................ G03B 17/14
396/91
2008/0084484 A1* 4/2008 Ochi ...................... G03B 13/02
348/222.1
(Continued)

FOREIGN PATENT DOCUMENTS

CN          104335116 A       2/2015
JP          2009-200552 A     9/2009
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/080302, dated May 31, 2018, with English translation.
(Continued)

*Primary Examiner* — Timothy J Henn
(74) *Attorney, Agent, or Firm* — Birch, Stewart, Kolasch & Birch, LLP

(57) ABSTRACT

A finder is configured to be capable of observing a subject image through a finder lens. A finder information display section performs display of information in a state where the information is superimposed on the subject image, and displays first to third angle-of-view frames. The first angle-of-view frames are a plurality of angle-of-view frames corresponding to the focal lengths of all the imaging lenses mountable on the mount section. The second angle-of-view frames are a plurality of angle-of-view frames corresponding to the focal lengths of the imaging lenses previously mounted on the mount section. The third angle-of-view frame is an angle-of-view frame corresponding to the focal length of the imaging lens mounted on the mount section. By displaying the angle-of-view frames of all the imaging lenses mountable on the mount section, it is possible to (Continued)

easily find an imaging lens having the optimum focal length for the captured scene.

7 Claims, 11 Drawing Sheets

(51) Int. Cl.
 G03B 17/20 (2006.01)
 H04N 13/282 (2018.01)
 H04N 5/225 (2006.01)
 G03B 13/02 (2006.01)

(52) U.S. Cl.
 CPC .......... *G03B 17/20* (2013.01); *H04N 5/2254* (2013.01); *H04N 5/23219* (2013.01); *H04N 5/23238* (2013.01); *H04N 5/23245* (2013.01); *H04N 5/23293* (2013.01); *H04N 5/232127* (2018.08); *H04N 5/232939* (2018.08); *H04N 13/282* (2018.05)

(58) Field of Classification Search
 CPC .......... H04N 5/23219; H04N 5/23293; H04N 5/2254; H04N 13/282; G03B 13/02; G03B 17/14; G03B 17/20
 See application file for complete search history.

(56) References Cited

U.S. PATENT DOCUMENTS

| 2008/0170152 | A1 | 7/2008 | Fujii | |
| 2010/0053377 | A1* | 3/2010 | Yanai | G06T 3/4023 348/240.2 |
| 2010/0277620 | A1* | 11/2010 | Iijima | H04N 5/23232 348/240.1 |
| 2010/0328513 | A1* | 12/2010 | Ryu | H04N 1/3875 348/333.02 |
| 2015/0029347 | A1* | 1/2015 | Tsubusaki | H04N 5/23296 348/208.1 |

FOREIGN PATENT DOCUMENTS

| JP | 2012-65294 A | 3/2012 |
| JP | 2012-168299 A | 9/2012 |
| JP | 2013-174719 A | 9/2013 |

OTHER PUBLICATIONS

International Search Report (Form PCT/ISA/210) for International Application No. PCT/JP2016/080302, dated Dec. 27, 2016, with English translation.
Chinese Office Action and Search Report for corresponding Chinese Application No. 201680067231.1, dated Dec. 5, 2018.

* cited by examiner

| FOCAL LENGTH | ANGLE-OF-VIEW FRAME DATA | STATE |
|---|---|---|
| 18mm | D18 | A |
| 35mm | D35 | B |
| 50mm | D50 | A |
| 60mm | D60 | A, C |
| 120mm | D120 | B |
| ⋮ | ⋮ | ⋮ |

IMAGING DEVICE AND CONTROL METHOD THEREFOR

CROSS-REFERENCE TO RELATED APPLICATIONS

This application is a Continuation of PCT International Application No. PCT/JP2016/080302 filed on 13 Oct. 2016, which claims priority under 35 U.S.C § 119(a) to Japanese Patent Application No. 2015-224739 filed on 17 Nov. 2015. The above application is hereby expressly incorporated by reference, in its entirety, into the present application.

BACKGROUND OF THE INVENTION

1. Field of the Invention

The present invention relates to an imaging device and a control method therefor.

2. Description of the Related Art

An imaging device such as a digital camera having a hybrid finder is known (refer to JP2012-065294A). The hybrid finder has an optical view finder (hereinafter referred to as "OVF") mode and an electric view finder (hereinafter referred to as "EVF") mode, both of which can be switched.

The hybrid finder has a finder information display section between a finder window on the subject side and an eyepiece window on the photographer's side. The finder information display section is composed of, for example, a half mirror and a display panel. The display panel is composed of a self-luminous display device such as an organic light-emitting diode (OLED) or a liquid crystal display device, and displays a subject image and an information image. The subject image is displayed on the display panel on the basis of the imaging data. The imaging data is obtained by performing photoelectric conversion of an image formed on an imaging element through an imaging lens. The information image is displayed on the basis of imaging condition data such as the shutter speed, the F number, and international organization for standardization (ISO), and the sensitivity. An optical image of a subject is incident onto the finder window. The half mirror partially transmits the optical image of the subject, and guides the optical image to the finder eyepiece section. Further, the half mirror partially reflects the display image, which is displayed by the display panel, and guides the image to the finder eyepiece section.

The hybrid finder has a shutter (hereinafter referred to as an OVF shutter) that blocks the optical image which is incident onto the finder window. In the OVF mode, the OVF shutter is open, the display panel is set to a non-display state, and thereby the optical image is guided into the finder eyepiece section. In the EVF mode, the OVF shutter is closed, and a display image is displayed on the display panel. The display image is guided to the finder eyepiece section through the half mirror.

The display surface of the display panel has a subject display area in which the subject image is displayed and an information display area in which the information image is displayed. The subject display area is set at the center portion of the display image, and the information display area is set in a frame shape so as to surround the subject display area. In the EVF mode, the hybrid finder displays images in both the subject display area and the information display area. In the OVF mode, the subject image in the subject display area is not displayed, and the information image in the information display area is displayed. Thus, by guiding the optical image and the information image to the finder eyepiece section through the half mirror, the information image is displayed to be superimposed on the optical image.

On the other hand, there is a known imaging device capable of mounting a plurality of imaging lenses having different focal lengths and displaying the angle of view of a non-mounted imaging lens in addition to the imaging lens mounted thereon (refer to JP2012-168299A). In this imaging device, by displaying an angle-of-view frame of a non-mounted imaging lens in an image captured through an imaging lens mounted on the mount section, it is possible to find an imaging angle of view of the non-mounted lens.

SUMMARY OF THE INVENTION

However, in the imaging device of JP2012-168299A, a captured image is acquired through the imaging lens mounted on the mount section, and the captured image is displayed on the display section. In a case of displaying the angle-of-view frame of the imaging lens having a focal length which is shorter than the focal length of the mounted imaging lens, the angle of view is greater than the angle of view of the mounted imaging lens. Therefore, in a case of the non-mounted imaging lens, only the frame is displayed outside the captured image. Therefore, the display is display of only the angle-of-view frame, and the subject image does not appear between the imaging angle-of-view frame of the mounted imaging lens and the angle-of-view frame of the non-mounted lens. Thus, for a user as a photographer, there is a problem that it is difficult to imagine the imaging angle of view of the non-mounted lens on the captured scene.

In the imaging device of JP2012-168299A, the imaging lens possessed by the user and the imaging lens that is not possessed by the user but can be mounted on the mount section are not distinguished. For this reason, in a case of displaying the angle-of-view frame of only the imaging lens possessed by the user, it is not possible to imagine the angle-of-view frames of the other line-up imaging lenses on the captured scene.

An object of the present invention is to provide an imaging device, by which an angle-of-view frame at the time of imaging can be easily imagined and which is capable of selecting an imaging lens having an optimum focal length for a captured scene, and a control method therefor.

In order to achieve the above-mentioned object, an imaging device of the present invention comprises: a mount section; an imaging element; a finder; a finder information display section; a mounting history storage section; a first angle-of-view frame display control section, a second angle-of-view frame display control section, and a third angle-of-view frame display control section. The mount section detachably holds a plurality of imaging lenses having different focal lengths. The imaging element generates an image on the basis of a subject image incident through one imaging lens mounted on the mount section. The finder is configured to be capable of observing the subject image through a finder lens. The finder information display section performs display so as to be capable of observing information in a state where the information is superimposed on the subject image, in the finder. The mounting history storage section stores a mounting history of the imaging lens previously mounted on the mount section. The first angle-of-view frame display control section controls the finder information display section such that the finder information display section displays, as the information, a plurality of first angle-of-view frames corresponding to the focal lengths of all the imaging lenses mountable on the mount section. The second angle-of-view frame display control section controls the finder information display section and sets one of the plurality of first angle-of-view frames, which corresponds to the focal length of the imaging lens previously mounted on the mount section, as a second angle-of-view frame on the basis of the mounting history, such that the finder information display section displays, as the information, the second angle-of-view frame in a display form different from a display form of the first angle-of-view frame. The third angle-of-view frame display control section controls the finder information display section such that the finder information display section displays, as the information, a third angle-of-view frame, which corresponds to the focal length of the imaging lens currently mounted on the mount section, in a display form different from the display forms of the first and second angle-of-view frames.

It is preferable that the imaging device comprises a determination section and a highlighting display control section. The determination section determines an optimum focal length suitable for a captured scene of the image. In addition, the highlighting display control section highlights an angle-of-view frame, which corresponds to the optimum focal length determined by the determination section, among the first to third angle-of-view frames.

It is preferable that, in addition to the information, the finder information display section displays the image, which is generated by the imaging element, such that the image is superimposed on or is close to the subject image. Further, it is preferable that the finder information display section displays an optimum angle-of-view frame, which corresponds to the optimum focal length determined by the determination section, in the image. Furthermore, it is preferable that the finder information display section lowers a luminance of a region other than the optimum angle-of-view frame in the image, and displays the region.

It is preferable that an electronic zoom function of cutting out a region having a size corresponding to an electronic zoom magnification from the image and enlarging the region is provided. The finder information display section displays a plurality of angle-of-view frames corresponding to a plurality of electronic zoom magnifications in the image before the electronic zoom function is executed.

A control method of an imaging device of the present invention is a control method of an imaging device including a mount section, an imaging element, a finder, and a finder information display section. In the method, a mounting history storing step, a first angle-of-view frame display control step, a second angle-of-view frame display control step, and a third angle-of-view frame display control step are processed. A plurality of imaging lenses having different focal lengths is detachably mounted on the mount section. The imaging element generates an image on the basis of a subject image incident through one imaging lens mounted on the mount section. The finder is configured to be capable of observing a subject image through a finder lens. The finder information display section performs display so as to be capable of observing information in a state where the information is superimposed on the subject image, in the finder. In the mounting history storing step, a mounting history of the imaging lens previously mounted on the mount section is stored. In the first angle-of-view frame display control step, the finder information display section is controlled such that the finder information display section displays, as the information, a plurality of first angle-of-view frames corresponding to the focal lengths of all the imaging lenses mountable on the mount section. In the second angle-of-view frame display control step, the finder information display section is controlled and one of the plurality of first angle-of-view frames, which corresponds to the focal length of the imaging lens previously mounted on the mount section, is set as a second angle-of-view frame on the basis of the mounting history, such that the finder information display section displays, as the information, the second angle-of-view frame in a display form different from a display form of the first angle-of-view frame. In the third angle-of-view frame display control step, the finder information display section is controlled such that the finder information display section displays, as the information, a third angle-of-view frame, which corresponds to the focal length of the imaging lens currently mounted on the mount section, in a display form different from the display forms of the first and second angle-of-view frames.

According to the present invention, it becomes easy to imagine the imaging area of another imaging lens not mounted on the mount section, and it becomes easy to select the imaging lens having the focal length optimum for the captured scene. In addition, motivation for using the non-possessed imaging lens is promoted, and sales of the imaging lens are promoted.

DESCRIPTION OF THE PREFERRED EMBODIMENTS

First Embodiment

Figure 1:
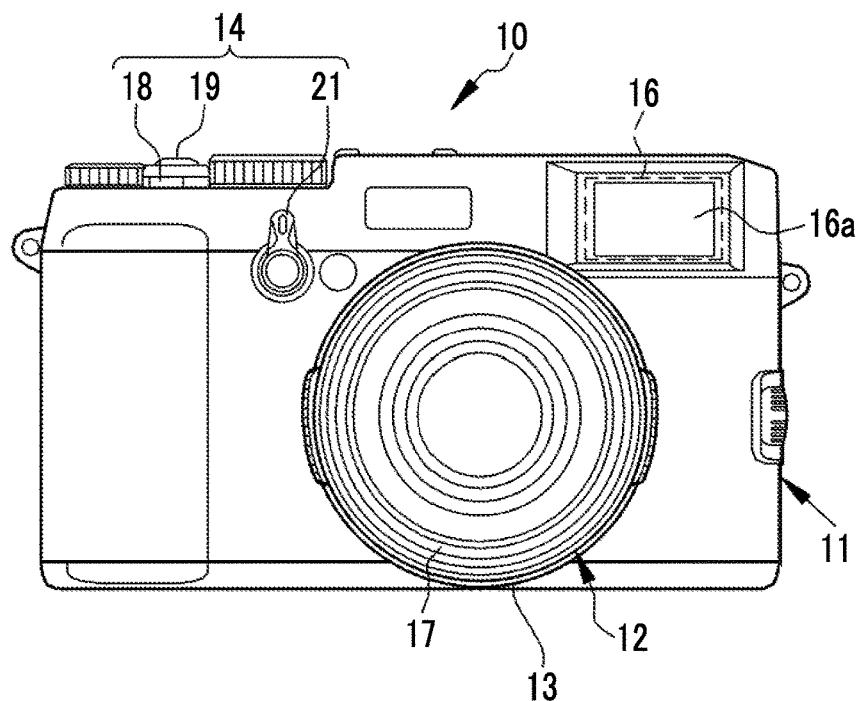
FIG. 1 is a front view of a digital camera.
Figure 2:
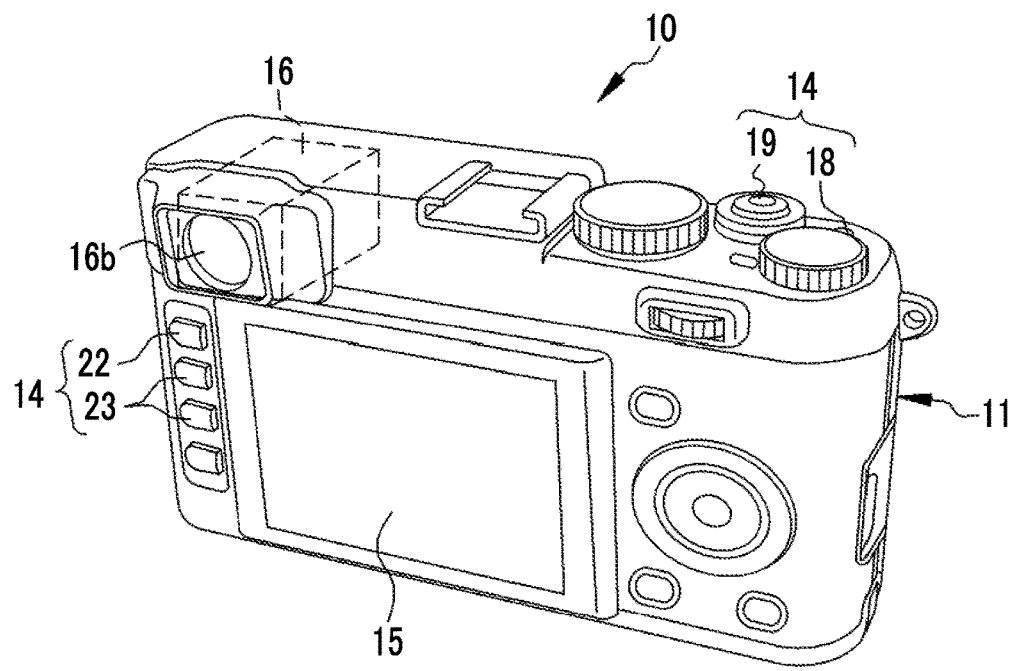
FIG. 2 is a perspective view of the rear side of the digital camera.

In FIGS. 1 and 2, the digital camera 10 comprises a camera body 11 and an imaging lens 12. The imaging lens 12 has a lens barrel 17 and is detachably mounted on the camera body 11 through a mount section 13. The camera body 11 comprises an operation section 14, a rear side display section 15, and a finder 16. The finder 16 is a hybrid type capable of switching an electric view finder (EVF) mode, an optical view finder (OVF) mode, and a total-angle-of-view display mode.

The operation section 14 has a power button 18, a release button 19, a finder switch lever 21, a mode selection button 22, a zoom button 23, and the like. The power button 18 is operated in a case where a power source (not shown in the drawing) of the digital camera 10 is turned on/off. The release button 19 is operated in a case where imaging is performed. The finder switch lever 21 is operated in a case of switching the finder 16 among the EVF mode, the OVF mode, and the total-angle-of-view frame display mode. The mode selection button 22 is operated in a case where the operation mode of the digital camera 10 is switched. The zoom button 23 is operated in a case where zooming is performed.

The release button 19 has a two-stage-stroke-type switch (not shown in the drawing) composed of an S1 switch and an S2 switch. In a case where the release button 19 is pressed (pressed halfway) by a half stroke and the S1 switch is turned on, the digital camera 10 performs an imaging preparation operation such as an autofocus (AF) operation. In a case where the release button 19 is further pressed (pressed fully) by a full stroke from this state and the S2 switch is turned on, an imaging operation is performed.

The operation modes of the digital camera 10 include a still imaging mode for acquiring a still image, a video imaging mode for acquiring a video image, a playback mode for reproducing and displaying each acquired image on the rear side display section 15, and the like. The rear side display section 15 is provided on the rear side of the camera body 11. The rear side display section 15 displays images acquired in various imaging modes and a menu screen for performing various settings.

The finder 16 has a finder window 16a, which is for capturing an optical image of a subject, and a finder eyepiece section 16b to which an eye of a user becomes close. The finder window 16a is provided on the front side of the camera body 11. The finder eyepiece section 16b is provided on the rear side of the camera body 11. The finder lens is composed of the finder window 16a and the finder eyepiece section 16b.

A slot (not shown in the drawing) is provided at the bottom of the camera body 11. A recording medium 40 (refer to FIG. 3) is mounted in the slot.

Figure 3:
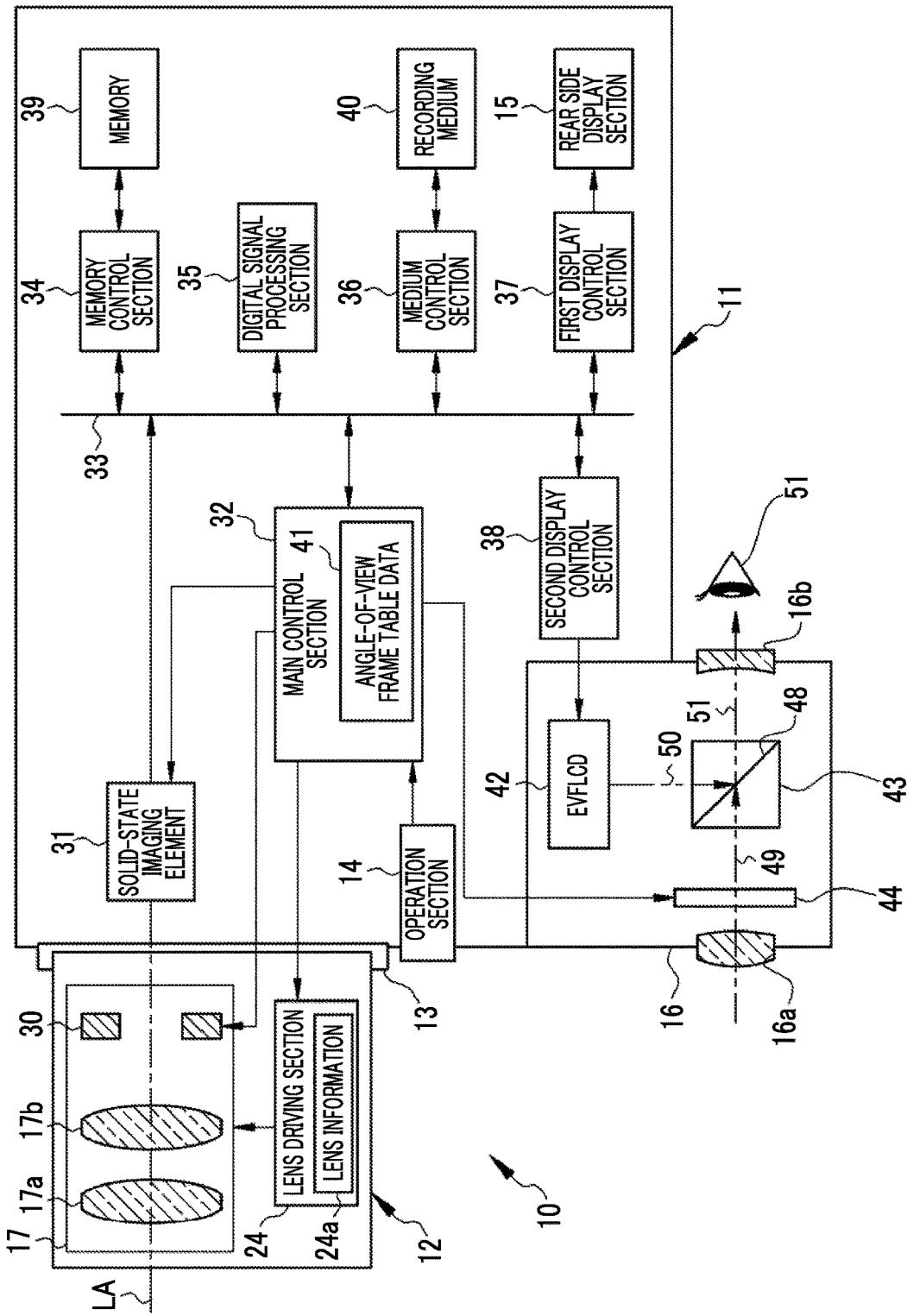
FIG. 3 is a block diagram illustrating an electric configuration of the digital camera.

As shown in FIG. 3, the imaging lens 12 is provided with a stop 30. The stop 30 adjusts an amount of light, which is incident into the solid-state imaging element 31, through driving control performed by the main control section 32. An optical image (subject image) of a subject, of which the amount of light is adjusted by the stop 30, passes through the lens barrel 17, and is incident onto the solid-state imaging element 31.

The lens barrel 17 holds a zoom lens 17a and a focus lens 17b. Inside the lens barrel 17, a lens driving section 24 is provided. The lens driving section 24 moves the zoom lens 17a and the focus lens 17b along the optical axis direction, under the control of the main control section 32. Zooming is performed through moving of the zoom lens 17a, and an AF operation is performed through moving of the focus lens 17b.

The solid-state imaging element 31 is provided in the camera body 11. The solid-state imaging element 31 is driven and controlled by the main control section 32 in accordance with the operation mode selected by the mode selection button 22 (refer to FIG. 2). The solid-state imaging element 31 is, for example, a complementary metal oxide semiconductor (CMOS) type or a charged-coupled device (CCD) type image sensor of a single plate color imaging type having a color filter of the RGB system. The solid-state imaging element 31 has a light receiving surface formed of a plurality of pixels (not shown in the drawing) arranged in a two-dimensional matrix shape. Each pixel includes a photoelectric conversion element, and photoelectrically converts an optical image, which is formed on the light receiving surface, so as to generate a captured image signal. Further, the solid-state imaging element 31 has an electronic shutter function, and a shutter speed (electric charge accumulation time period) thereof can be adjusted.

The solid-state imaging element 31 comprises a denoising circuit, an auto gain controller, and a signal processing circuit such as an A/D conversion circuit (any of those is not shown in the drawing). The denoising circuit performs denoising processing on the captured image signal. The auto gain controller amplifies a level of the captured image signal to an optimum value. The A/D conversion circuit converts the captured image signal into a digital signal, and outputs the signal from the solid-state imaging element 31. The output signal of the solid-state imaging element 31 is image data (so-called RAW (Raw image format) data) having one color signal for each pixel.

The solid-state imaging element 31 and the main control section 32 are connected to a bus 33. In addition, a memory control section 34, a digital signal processing section 35, a medium control section 36, a first display control section 37, and a second display control section 38 are connected to the bus 33.

A memory 39 for a temporary storage such as synchronous dynamic random access memory (SDRAM) is connected to the memory control section 34. The memory control section 34 inputs the image data, which is output from the solid-state imaging element 31, to the memory 39, and stores the image data. Further, the memory control section 34 outputs the image data, which is stored in the memory 39, to the digital signal processing section 35.

The digital signal processing section 35 performs defect correction processing, demosaicing processing, gamma correction processing, white balance correction processing, YC conversion processing, and the like on the image data (RAW data) which is input from the memory 39, and generates YC image data consisting of a luminance signal Y and a color difference signal C.

The medium control section 36 controls recording of image files into the recording medium 40 and reading of the image files from the recording medium 40. The recording medium 40 is, for example, a memory card into which a flash memory and the like are built.

In a case of the still imaging mode, as the image files, for example, compressed image data, which is obtained by compressing the YC image data in conformity with the joint photographic experts group (JPEG) standard, is recorded into the recording medium 40. Further, in a case of the video imaging mode, video image data, which is obtained by compressing the YC image data of a plurality of frames obtained through video imaging in conformity with the moving picture expert group (MPEG)-4 standard, is recorded into the recording medium 40. Such compression processing is performed by the digital signal processing section 35. In addition, in the case of the video imaging mode, in addition to the images, sound is acquired and recorded, but in the present embodiment, a description of a configuration for acquiring and recording sound will be omitted.

The first display control section 37 controls image display on the rear side display section 15. Specifically, the first display control section 37 generates a video signal complying with the national television system committee (NTSC) standard on the basis of the YC image data, which is generated by the digital signal processing section 35, and outputs the signal to the rear side display section 15.

The second display control section 38 generates the video signal based on the YC image data in a manner similar to the first display control section 37, and outputs the signal to a liquid crystal display device (EVFLCD) 42 to be described later. The second display control section 38 constitutes a first angle-of-view frame display control section, a second angle-of-view frame display control section, and a third angle-of-view frame display control section. A first angle-of-view frame display control step, a second angle-of-view frame display control step, and a third angle-of-view frame display control step are performed by the second display control section 38.

The finder 16 is provided with an EVFLCD 42, a prism 43, and an OVF shutter 44. The EVFLCD 42, the prism 43, and the OVF shutter 44 constitute a finder information display section. The finder information display section performs display so as to be capable of observing information such as an information image 57 in a state where the information is superimposed on an optical image 59 (refer to (B) of FIG. 8) obtained through the finder lens consisting of the finder window 16a and finder eyepiece section 16b.

The EVFLCD 42 has a backlight and a liquid crystal panel. The backlight illuminates the liquid crystal panel surface light. The liquid crystal panel is a transmissive liquid crystal panel having a plurality of liquid crystal cells, and controls the light transmittance of each liquid crystal cell on the basis of the video signal which is input from the second display control section 38. At this time, image display is performed by the light emitted from the backlight and transmitted through the liquid crystal panel.

Figures 4, 5:
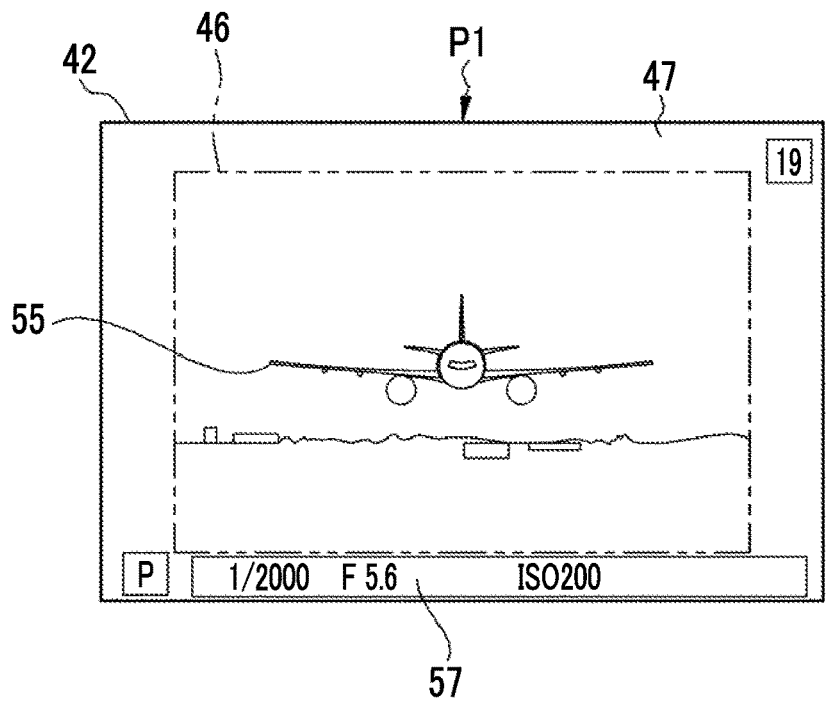
FIG. 4 is a diagram illustrating an example of an EVF image in the EVF mode.
FIG. 5 is a diagram illustrating angle-of-view frame table data.

As shown in FIG. 4, a subject display area 46 and an information display area 47 are set in the EVFLCD 42. In the subject display area 46, the subject image 55 and first to third angle-of-view frames 61 to 63 (refer to (A) of FIG. 9) to be described later are displayed. The subject image 55 is a display image of the YC image data generated by the digital signal processing section 35. The angle-of-view frames 61 to 63 are display images generated by the main control section 32 on the basis of the angle-of-view frame data. The angle-of-view frames 61 to 63 each represent the angle-of-view frame for each focal length of the imaging lens 12.

The information display area 47 is set to have a frame shape surrounding the subject display area 46. In the information display area 47, the information image 57 is displayed. The information image 57 is a display image of information image data which is generated by the main control section 32. The information image data is generated on the basis of imaging information such as imaging conditions, the number of images which can be captured, and imaging modes. Examples of the information image 57 include "1/2000" that indicates the shutter speed as an example of the imaging information, "F5.6" that indicates the F number, "ISO200" that indicates the ISO sensitivity, "P" that indicates the imaging modes, and "19" that indicates the number of images which can be captured.

As shown in FIG. 3, the main control section 32 comprises angle-of-view frame table data 41. As shown in FIG. 5, the angle-of-view frame table data 41 has a focal length column 41a, an angle-of-view frame data column 41b, and a state column 41c. The focal length column 41a stores the focal lengths of all the imaging lenses 12 that are mounted on the mount section 13 and usable in the digital camera 10. The angle-of-view frame data column 41b stores angle-of-view frame data D18, D35, D50, . . . corresponding to the focal lengths of the respective imaging lenses 12. For example, in a case of an imaging lens having a focal length of 18 mm, the angle-of-view frame data D18 is registered.

The state column 41c stores one of the identification symbols A, B, and C. The identification symbol A is attached to the imaging lens 12 possessed by a user who holds the camera body 11. This identification symbol A is automatically attached to the imaging lens 12 that has the focal length and is previously mounted on the mount section 13 of the camera body 11 possessed by the user. Thereby, it is possible to reduce separate efforts for possession and registration. The identification symbol B is attached to a usable imaging lens 12 which is not possessed by the user. The identification symbol C is attached to the imaging lens 12 currently mounted on the mount section 13 of the camera body 11. Accordingly, it is possible to find the mounting history of the imaging lens 12 to the camera body 11 and presence or absence of the imaging lens 12 on the basis of the identification symbols A to C of the state column 41c.

In the angle-of-view frame table data 41 shown in FIG. 5, the identification symbol A is attached to the imaging lenses 12 having focal lengths of 18 mm, 50 mm, and 60 mm. Thus, it is possible to find that the imaging lenses 12 are currently possessed. Further, an identification symbol C is attached to the imaging lens 12 having the focal length of 60 mm. Thus, it is possible to find that the imaging lens 12 is mounted on the mount section 13. Furthermore, the identification symbol B is attached to the imaging lenses of 35 mm and 120 mm. Thus, it is possible to find that the imaging lenses 12 are not possessed by the user at the current time.

Figure 6:
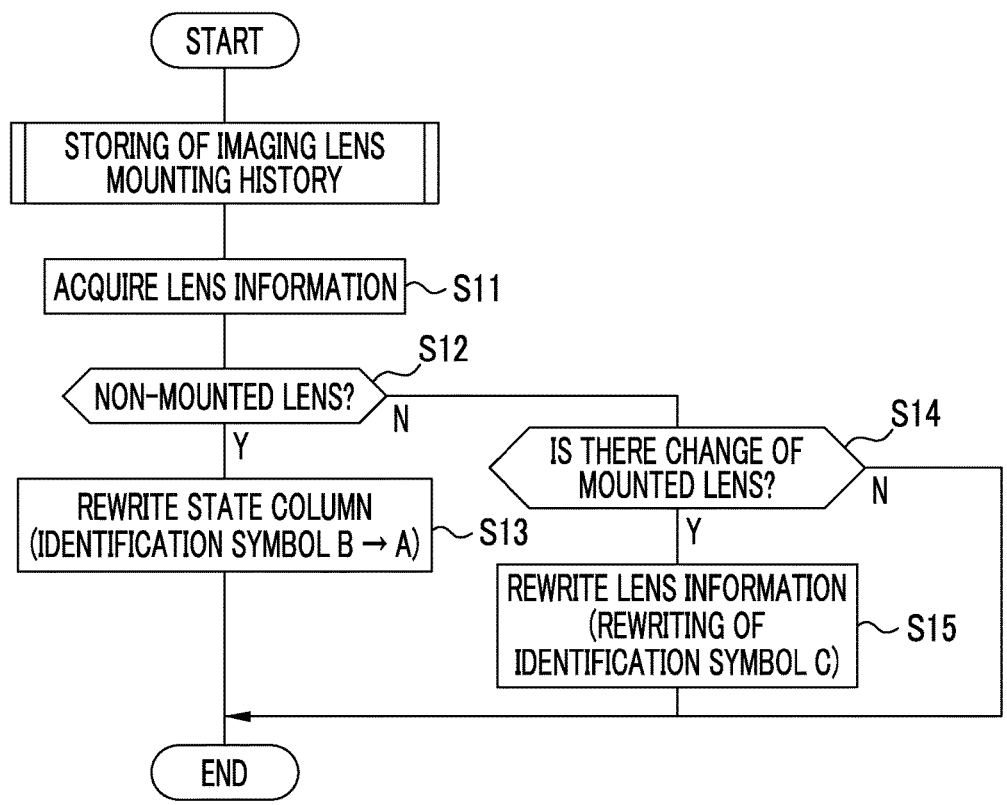
FIG. 6 is a flowchart illustrating processing of storing a mounting history of an imaging lens.

FIG. 6 is a flowchart illustrating processing (mounting history storing step) of storing the mounting history by using the angle-of-view frame table data 41. In a case where the power button 18 of the digital camera 10 is operated and the power source is turned on, the processing of storing the mounting history in the angle-of-view frame table data 41 is started. First, the main control section 32 reads lens information 24a of the lens driving section 24 through the mount section 13 (S11). In a case where the identification symbol of the state column 41c of the corresponding imaging lens 12 in the angle-of-view frame table data 41 is "B", on the basis of the read lens information 24a, it is determined that the imaging lens 12 is not mounted (S12), and the identification symbol is rewritten to the identification symbol A (S13). By this rewriting, the processing of storing the imaging lens mounting history is completed. It is determined whether or not the imaging lens 12 is changed (S14), and then in a case where the imaging lens 12 is different from that at the previous time when power source is turned on (in a case where the imaging lens is changed), the lens information is rewritten.

The lens information 24a may be an identification mark that can be optically or mechanically read, instead of electronic one. In this case, the identification mark is provided on the imaging lens 12 at a position corresponding to the mount section 13, and is optically or mechanically read by a mark sensor (not shown in the drawing) on the camera body 11 side. The mounting history storage section is configured by the function of reading the lens information 24a from the imaging lens 12 through the main control section 32 and the function of writing the identification symbol A in the state column 41c of the angle-of-view frame table data 41. The mounting history storage section performs the mounting history storing step.

The angle-of-view frame table data 41 can be updated whenever a new imaging lens 12 is additionally sold, for example. The update is, for example, performed by reading new update data through the recording medium 40 (refer to FIG. 3). Further, instead of updating through the recording medium 40, the update is performed through, for example, a universal serial bus (USB) connection with a personal computer which is not shown in the drawing. Furthermore, the update is performed together with software update at the time of version upgrade of software. In this manner, the angle-of-view frame table data 41 corresponds to a list of the latest usable imaging lenses 12.

Returning to FIG. 3, a half mirror 48 as an optical path combining section is formed inside the prism 43. The half mirror 48 is disposed to form an angle of 45 degrees with respect to a first optical path 49, through which the optical image of the subject incident onto the finder window 16a propagates, and a second optical path 50 through which the display image displayed on the EVFLCD 42 propagates. The half mirror 48 obtains a third optical path 51 by combining the first optical path 49 and the second optical path 50. The finder eyepiece section 16b is disposed on the third optical path 51. The half mirror 48 transmits a part of the optical image, which propagates on the first optical path 49, so as to guide the image into the third optical path 51, and reflects a part of the display image, which propagates on the second optical path 50, so as to guide the image into the third optical path 51.

The OVF shutter 44 is a liquid crystal shutter, and is disposed on the first optical path 49. The OVF shutter 44 is controlled by the main control section 32 such that it switches between "a closed state", in which the optical image incident from the finder window 16a is not incident into the prism 43 by blocking light of the optical image, and "an opened state" in which the optical image is transmitted and incident into the prism 43. The OVF shutter 44 is set to the "opened state" in the case of the OVF mode, the total-angle-of-view frame display mode, the hybrid mode to be described later, and is set to the "closed state" in the case of the EVF mode.

Figure 7:
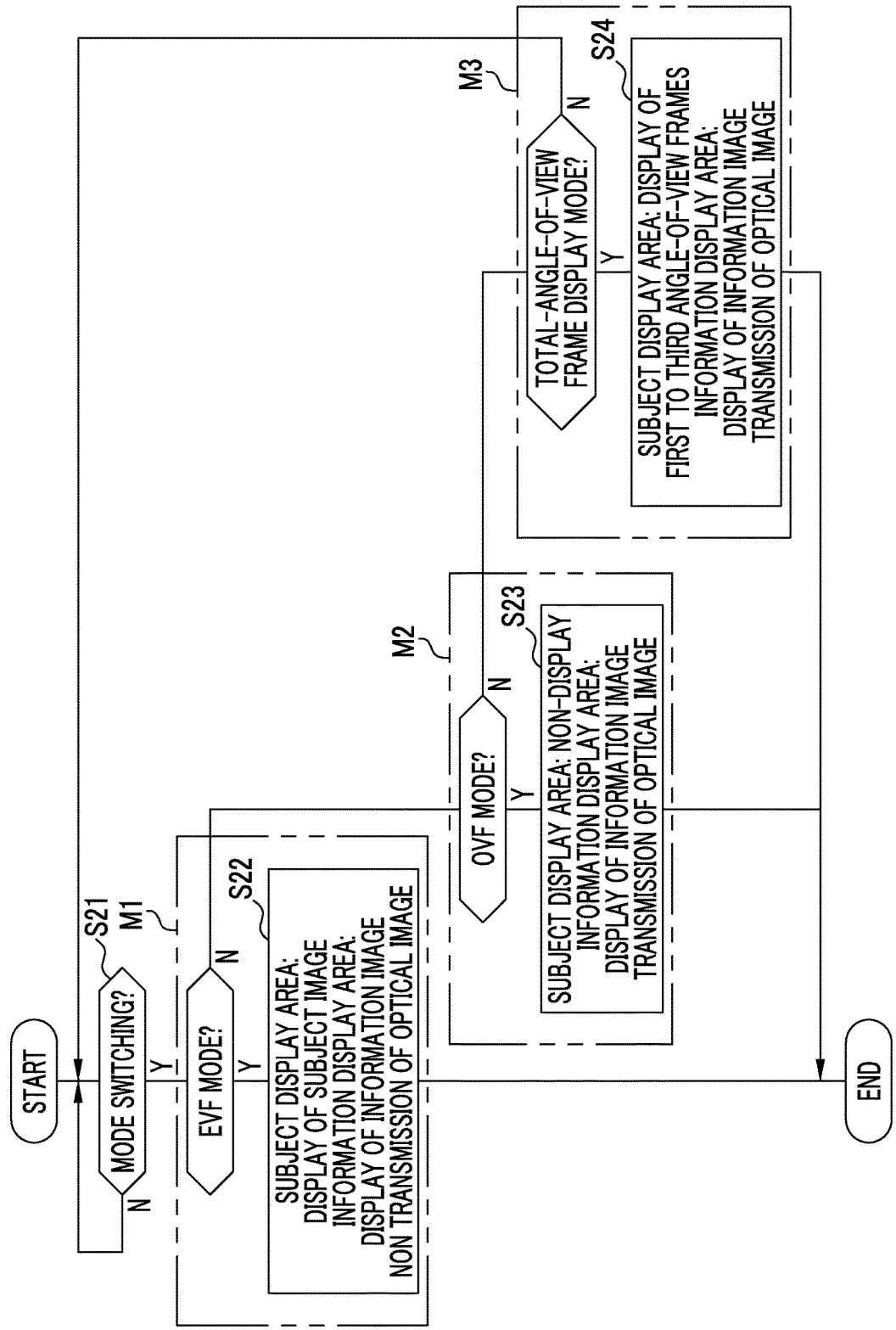
FIG. 7 is a flowchart illustrating mode switching processing of the EVF mode, an OVF mode, and a total-angle-of-view frame display mode.

FIG. 7 is a flowchart illustrating mode switching processing for switching the EVF mode M1, the OVF mode M2, and the total-angle-of-view frame display mode M3. It is possible to perform switching to the EVF mode M1, the OVF mode M2, and the total-angle-of-view frame display mode M3 by operating the finder switch lever 21, the mode selection button 22, or the like of the operation section 14.

In the EVF mode M1, as shown in FIG. 4, the second display control section 38 displays the subject image 55 in the subject display area 46, and generates a video signal for displaying the information image 57 in the information display area 47. Regarding signal values of parts corresponding to the information display area 47 of the video signal, signal values of a part indicating imaging information such as texts are at, for example, the maximum gradation (white) level, and signal values of the other part are at, for example, the minimum gradation (black) level. The subject image 55 and the information image 57 are guided to the third optical path 51 by propagating on the second optical path 50 and being reflected by the half mirror 48. Since the OVF shutter 44 is set to the "closed state", the optical image 59 is not incident onto the half mirror 48. As a result, the EVF image P1, on which the subject image 55 and the information image 57 shown in FIG. 4 are displayed, is guided to the finder eyepiece section 16b (S22).

Figure 8:
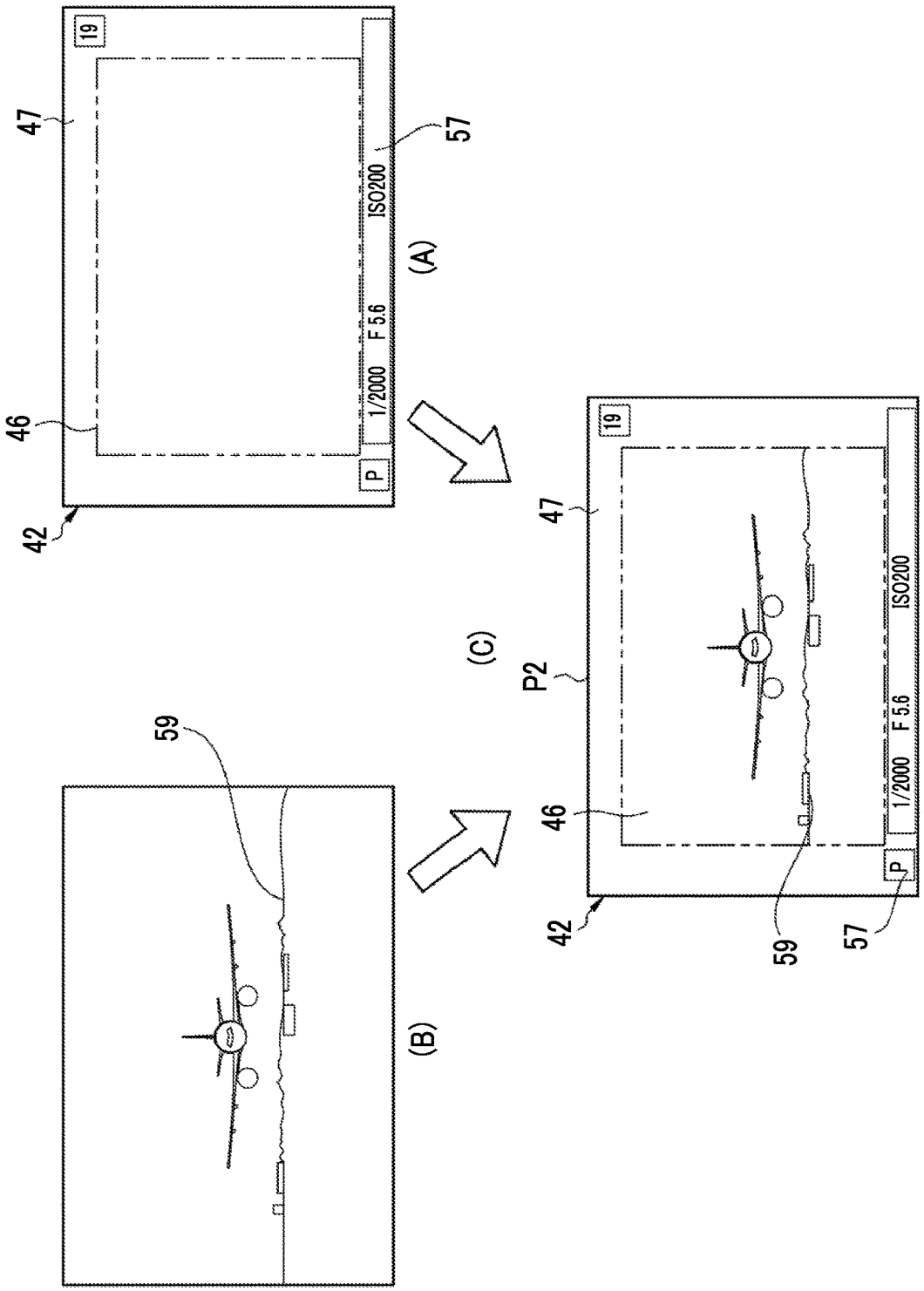
FIG. 8 is a diagram illustrating an example of an OVF image in the OVF mode.

In the OVF mode M2, the second display control section 38 generates the video signal for displaying nothing in the subject display area 46 and displaying the information image 57 in the information display area 47. The signal values of a part corresponding to the subject display area 46 of the video signal are at the black level. Further, in a manner similar to that of the above-mentioned EVF mode M1, regarding the signal values of the parts corresponding to the information display area 47 of the video signal, the signal values of the part indicating the imaging information are at the white level, and the signal values of the other part are at the black level. Accordingly, as shown in (A) of FIG. 8, only the information image 57 is displayed on the EVFLCD 42. As shown in FIG. 3, the information image 57 propagates on the second optical path 50, is reflected by the half mirror 48, and is guided to the third optical path 51. Since the OVF shutter 44 is set to the "opened state", the optical image 59 shown in (B) of FIG. 8 is transmitted through the OVF shutter 44. The optical image 59 propagates on the first optical path 49, is transmitted through the half mirror 48, and is guided to the third optical path 51. As a result, as shown in (C) of FIG. 8, an OVF image P2, in which the optical image 59 and the information image 57 are superimposed, is guided to the finder eyepiece section 16b (S23).

Figure 9:
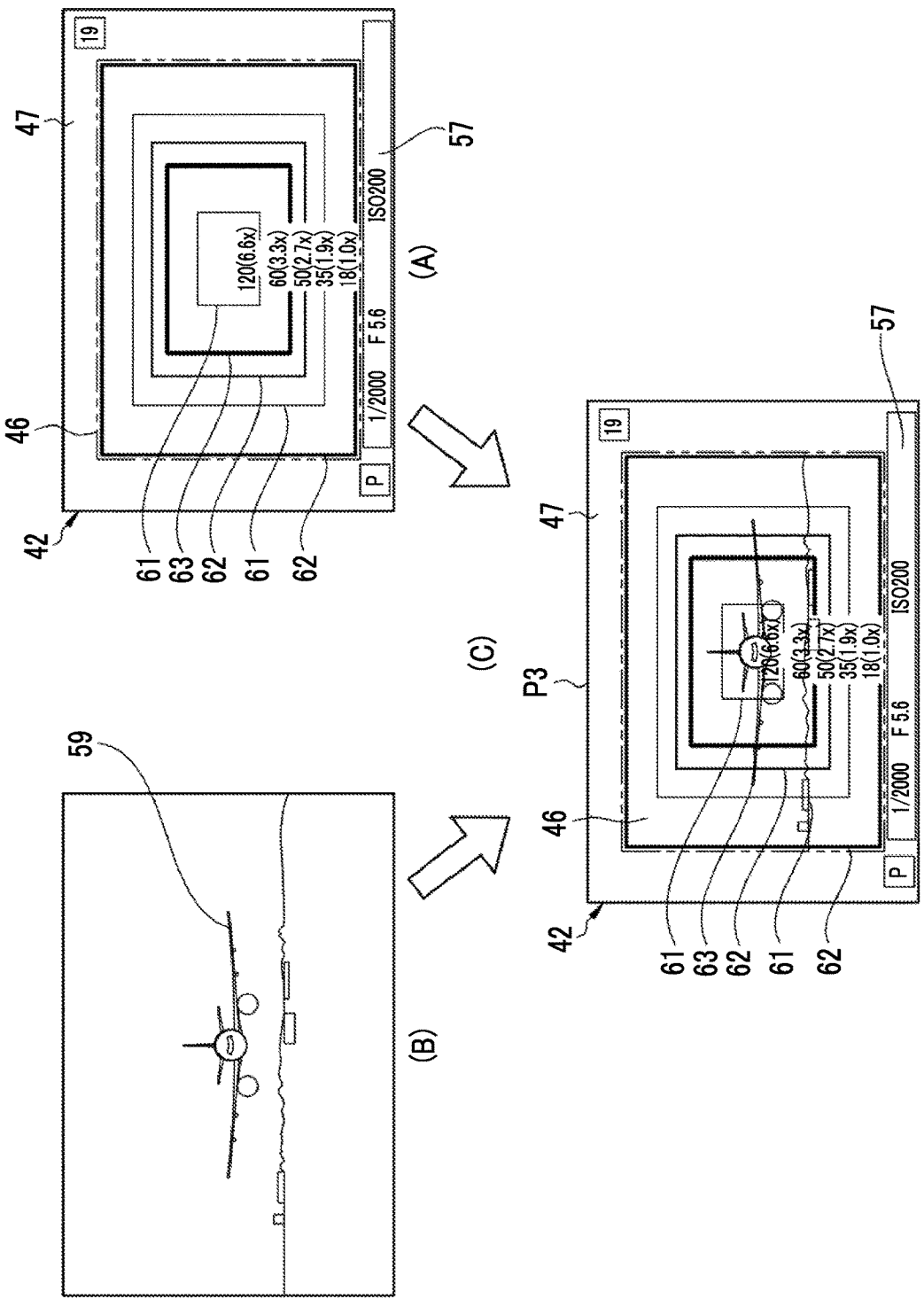
FIG. 9 is a diagram illustrating an example of an OVF image in the total-angle-of-view frame display mode.

In the total-angle-of-view frame display mode M3 shown in FIG. 7, as shown in (A) of FIG. 9, the second display control section 38 (refer to FIG. 3) displays a first angle-of-view frame 61, a second angle-of-view frame 62, and a third angle-of-view frame 63 in the subject display area 46, and displays the information image 57 in the information display area 47. The angle-of-view frames 61 to 63 are created on the basis of the angle-of-view frame data of the angle-of-view frame table data 41. The angle-of-view frames 61 to 63 indicate areas (imaging areas) captured by the solid-state imaging element 31 in the OVF image, and each frame is displayed for each focal length (S24).

The first angle-of-view frame 61 is created on the basis of the angle-of-view frame data of the identification symbol B. The first angle-of-view frame 61 indicates angle-of-view frames of all the imaging lenses 12 currently on sale in a case where the imaging lenses 12 are used. The second angle-of-view frame 62 is created on the basis of the angle-of-view frame data of the identification symbol A. The second angle-of-view frame 62 indicates an angle-of-view frame of the currently possessed imaging lens 12 in a case where the imaging lens 12 is used. The third angle-of-view frame 63 is created on the basis of the angle-of-view frame data of the identification symbol C. The third angle-of-view frame indicates an angle-of-view frame of the imaging lens 12 currently mounted on the camera body 11 in a case where the imaging lens 12 is used.

The first to third angle-of-view frames 61 to 63 are displayed in white, and the other portions are displayed in black. In addition, a number indicating the focal length of each of the angle-of-view frames 61 to 63 and an enlarging magnification based on the maximum angle-of-view frame are displayed in, for example, white at the center of the lower side of each of the angle-of-view frames 61 to 63.

In each of the first to third angle-of-view frames 61 to 63, the width of each frame line is increased in the order of the first angle-of-view frame 61, the second angle-of-view frame 62, and the third angle-of-view frame 63, and thus these first to third angle-of-view frames 61 to 63 can be identified. Instead of or in addition to change in width of the frame line, the luminance of the frame line may be changed for each of the angle-of-view frames 61 to 63.

As shown in FIG. 3, the first to third angle-of-view frames 61 to 63 propagate on the second optical path 50, are reflected by the half mirror 48, and are guided to the third optical path 51. Since the OVF shutter 44 is set to the "opened state", the optical image 59 shown in (B) of FIG. 9 is transmitted through the OVF shutter 44. The optical image 59 propagates on the first optical path 49, is transmitted through the half mirror 48, and is guided to the third optical path 51. As a result, as shown in (C) of FIG. 9, the OVF image P3, in which the optical image 59, the information image 57, and the first to third angle-of-view frames 61 to 63 are superimposed, is guided to the finder eyepiece section 16b (S24).

The user is able to confirm the imaging area through the first to third angle-of-view frames 61 to 63 in the OVF image P3. Further, not only the third angle-of-view frame 63 of the imaging lens 12 mounted on the mount section 13 but also the second angle-of-view frame 62 of the possessed imaging lens 12 and the first angle-of-view frame 61 of the not-purchased imaging lens 12 are displayed. Therefore, the user is able to easily imagine which one is the best angle-of-view frame corresponding to the current captured scene. In a case where the optimum angle-of-view frame is the second angle-of-view frame 62, by replacing the imaging lens 12 with the imaging lens 12 having the angle-of-view frame, it is possible to perform imaging with the optimum angle-of-view frame. In addition, in a case where the optimum angle-of-view frame is the first angle-of-view frame 61, motivation for newly purchasing the imaging lens 12 is provided, which leads to sales promotion of the imaging lens 12.

In the present embodiment, the first to third angle-of-view frames 61 to 63 are displayed to have a frame shape surrounding a specific region. However, as the shape, any shape is used if it is a display shape capable of recognizing the specific region. For example, only corner parts of the frame may be displayed. Although not shown in the drawing, the AF frame may be displayed together with the angle-of-view frames 61 to 63. The AF frame may be displayed in the EVF mode M1 or the OVF mode M2 other than the total-angle-of-view frame display mode M3.

The AF frame indicates a target area (focus area) obtained when the AF operation is performed, in a captured image signal which is generated by the solid-state imaging element 31. The AF operation is performed by controlling driving of the focus lens 17b such that an AF evaluation value (for example, value of summation of high-frequency components) included in the captured image signal corresponding to the AF frame is maximized. The AF frame is fixed at, for example, the center of the imaging area. Otherwise, the AF frame is set through the operation section 14, or is set as a face part of a person which is detected through a face detection function.

Next, operations of the digital camera 10 will be described. First, if a user operates the power supply button 18 so as to turn on the power, a power supply voltage is supplied to each section of the digital camera 10. As shown in FIG. 6, in a case where the power source is turned on, the processing of storing the imaging lens mounting history is performed. First, the lens information of the imaging lens 12 mounted on the mount section 13 is read (S11). Next, it is determined whether or not the lens is a non-mounted lens on the basis of the lens information (S12). In the lens information, in a case where is the identification symbol is B in the state column 41c in the angle-of-view frame table data 41 (in a case of the non-mounted lens), the identification symbol B is rewritten to the identification symbol A indicating that the imaging lens is possessed (S13). In a case where the lens is not the non-mounted lens in step S12, it is determined whether or not the mounted lens is changed (S14). According to the determination, in a case where the imaging lens 12 having the focal length at which the identification symbol C is stored is the same as the imaging lens mounted on the mount section 13 (in a case where there is no change), the identification symbol C of the imaging lens 12 having this focal length in the state column 41c is maintained as it is. According to the determination, in a case where the imaging lens 12 having the focal length of the table data 41 to which the identification symbol C is attached is different from the imaging lens 12 mounted on the mount section 13 (in a case where there is a change), the identification symbol thereof is rewritten to the identification symbol C in the state column 41c of the corresponding imaging lens 12 (S15). In addition, in the state column 41c of the imaging lens 12 to which the identification symbol C was previously attached, the identification symbol C is rewritten to the identification symbol B (S15). In this manner, the mounting history storage section performs update processing.

In a case where the operation section 14 is operated and for example a program imaging mode is selected as the imaging mode, the shutter speed and the F number are automatically set. Further, in a case where the mode selection button 22 is operated and the still imaging mode is selected, the finder 16 starts operating.

As shown in FIG. 7, one of the EVF mode M1, the OVF mode M2, and the total-angle-of-view frame display mode M3 is selected by operating the finder switch lever 21 (refer to FIG. 3) (S21).

In the EVF mode M1, as shown in FIG. 4, the subject image 55 is displayed in the subject display area 46, and the information image 57 is displayed in the information display area 47. The subject image 55 and the information image 57 are guided to the third optical path 51 by propagating on the second optical path 50 and being reflected by the half mirror 48. Since the OVF shutter 44 is set to the "closed state", the optical image 59 is not incident onto the half mirror 48. As a result, the EVF image P1, which has the subject image 55 and the information image 57 shown in FIG. 4, is guided to the finder eyepiece section 16b (S22).

In the OVF mode M2, the second display control section 38 generates the video signal for displaying nothing in the subject display area 46 and displaying the information image 57 in the information display area 47. Thereby, only the information image 57 propagates on the second optical path 50, and is reflected by the half mirror 48, and the information image 57 is led to the third optical path 51. Since the OVF shutter 44 is set to the "opened state", the optical image 59 is transmitted through the OVF shutter 44, propagates on the first optical path 49, and is transmitted through the half mirror 48. Thereby, the optical image 59 is guided to the third optical path 51. As a result, as shown in (C) of FIG. 8, an OVF image P2, in which the optical image 59 and the information image 57 are superimposed, is guided to the finder eyepiece section 16b (S23).

In the total-angle-of-view frame display mode M3, as shown in (A) of FIG. 9, the second display control section 38 (refer to FIG. 3) generates a video signal for displaying a first angle-of-view frame 61, a second angle-of-view frame 62, and a third angle-of-view frame 63 in the subject display area 46, and displaying the information image 57 in the information display area 47. The angle-of-view frames 61 to 63 are created on the basis of the angle-of-view frame data of the angle-of-view frame table data 41.

In the total-angle-of-view frame display mode M3, the information image 57 and the first to third angle-of-view frames 61 to 63 propagate on the second optical path 50, are reflected by the half mirror 48, and are guided to the third optical path 51. Since the OVF shutter 44 is set to the "opened state", the optical image 59 shown in (B) of FIG. 9 is transmitted through the OVF shutter 44, propagates on the first optical path 49, is transmitted through the half mirror 48, and is guided to the third optical path 51. As a result, as shown in (C) of FIG. 9, the OVF image P3, in which the optical image 59, the information image 57, and the angle-of-view frames 61 to 63 are superimposed, is guided to the finder eyepiece section 16b (S24). The user is able to confirm the imaging conditions and the respective angle-of-view frames 61 to 63 while observing the optical image 59 of the subject through the finder eyepiece section 16b.

In a case where the release button 19 is fully pressed in this state, the subject image is captured with the third angle-of-view frame 63 corresponding to the focal length of the mounted imaging lens 12.

Second Embodiment

Figure 10:
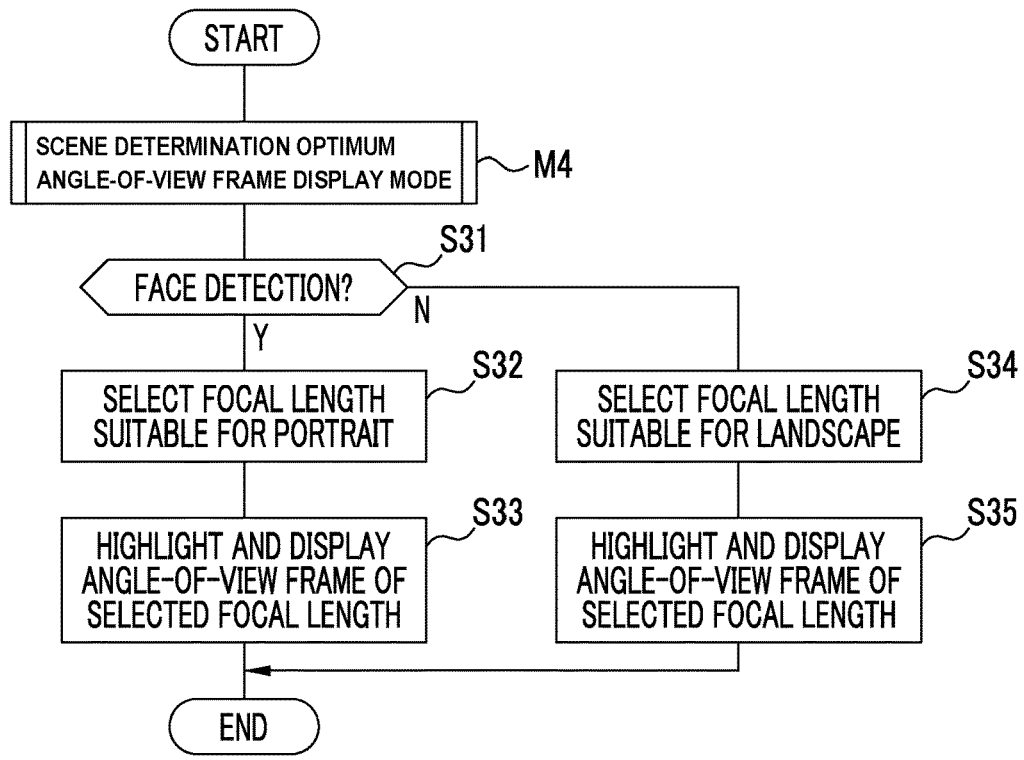
FIG. 10 is a flowchart illustrating processing in a scene determination optimum angle-of-view frame display mode.
Figure 11:
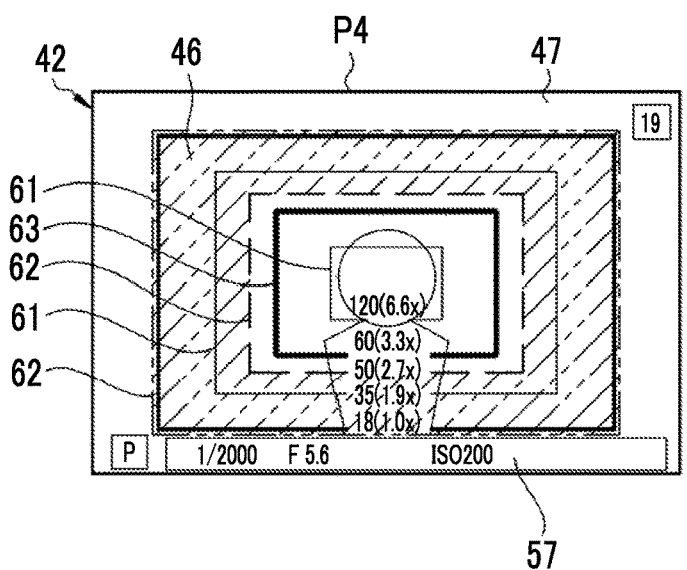
FIG. 11 is a diagram illustrating an example of an OVF image in the scene determination optimum angle-of-view frame display mode.

In the second embodiment shown in FIGS. 10 and 11, a captured scene is determined on the basis of image data, and an angle-of-view frame corresponding to the optimum imaging focal length is highlighted and displayed on the basis of the determination result. The determination of the captured scene is performed by the main control section 32, and the determination section is constituted by the main control section 32. The determination section determines the optimum focal length suitable for the captured scene of the image. In addition, the highlighting display control section which highlights and displays the angle-of-view frame corresponding to the optimum focal length is constituted by the second display control section 38. The highlighting display of the angle-of-view frame is performed by operating the mode selection button in the OVF mode so as to select the scene determination optimum angle-of-view frame display mode M4. In the scene determination optimum angle-of-view frame display mode M4, the main control section 32 performs scene determination and optimum angle-of-view selection processing.

In the scene determination, presence or absence of face detection is determined (S31). In presence or absence of face detection, in a case where a face is detected, a focal length suitable for portrait is selected (S32), and an OVF image P4 highlighting the angle-of-view frame of the imaging lens 12 having this focal length is displayed (S33). The method of detecting the face is well known, and the description thereof will be omitted.

In the captured scene of FIG. 11, it is determined that the imaging lens 12 having a focal length of 50 mm has the optimum angle-of-view frame, and the second angle-of-view frame 62 of the imaging lens 12 is switched to the dotted line display, and is highlighted by blinking. The highlighting display of the optimum angle-of-view frame employs a display form different from that of the highlighting display of the third angle-of-view frame in the first embodiment. For example, in addition to the dotted line display of the frame line and the blinking display of the frame line, the color of the frame line is displayed to be changed from white to red, for example. One of these highlighting display operations may be adopted, or combination of a plurality of the operations may be adopted.

Further, as indicated by hatching with two-dot chain lines, the region of the subject image 55 other than the optimum angle-of-view frame may be displayed at a luminance lower than the luminance of the inside of the optimum angle-of-view frame. In this case, the image within the optimum angle-of-view frame becomes clear, and the determination of the angle-of-view frame becomes easy.

Instead of or in addition to presence or absence of the face detection, on the basis of the area of the region of the detected face, in a case where the area of the face region is equal to or greater than a predetermined value, an angle-of-view frame having an area of for example 1.25 times the face region may be selected as the optimum angle-of-view frame. The area ratio between the face region and the inside of the angle-of-view frame is not limited to 1.25 times, and may be appropriately changed.

Next, in a case where a face is not detected through determination of presence or absence of the face detection, it is determined that the captured scene is a landscape (S31). In a case where it is determined that the scene is a landscape, the angle-of-view frame of a wide angle type imaging lens optimum for landscape imaging is selected (S34), and a frame line of the angle-of-view frame is drawn using different line types such as a one-dot chain line and a two-dot chain line, or is displayed in blue, for example (S35). The relationship between the scene determination result that the scene is a landscape and the optimum angle-of-view frame for the scene determination result is stored in advance. The method of determining whether or not the scene is a landscape is well known, and a detailed description will be omitted. For example, instead of or in addition to presence or absence of the face detection, feature data samples prepared in advance for each captured scene may be stored. In this case, by generating feature data indicating the feature of the captured scene from the image data and comparing the feature data and the feature data sample, it is determined whether or not the scene is a landscape.

Third Embodiment

In the first embodiment, the EVF mode M1, the OVF mode M2, and the total-angle-of-view frame display mode M3 are switched. In the third embodiment, in addition to the modes M1 to M3, there is provided a hybrid mode M5 capable of observing the subject image 55 and the optical image 59 at the same time. In the following description, only the hybrid mode M5 will be described, the EVF mode M1, the OVF mode M2, and the total-angle-of-view frame display mode M3 are the same as those in the first embodiment, and the description thereof will be omitted.

Figure 12:
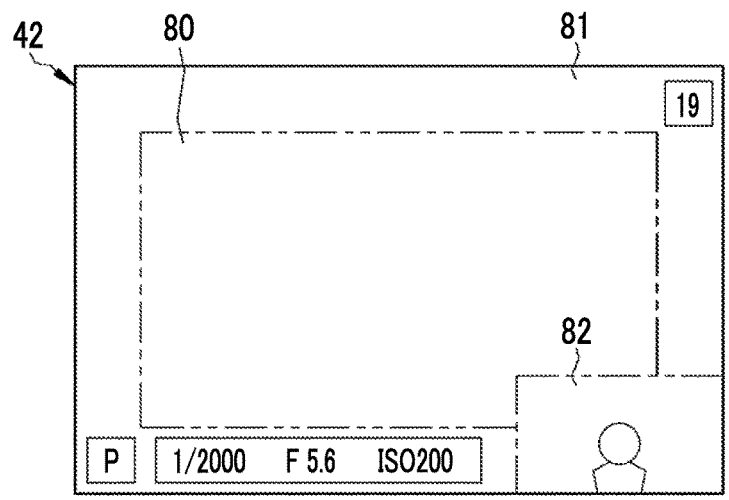
FIG. 12 is a diagram illustrating a subject display area, an information display area, and a sub-display area in a hybrid mode.

As shown in FIG. 12, in the EVFLCD 42, a subject display area 80, an information display area 81, and a sub-display area 82 smaller than the subject display area 80 are set. The sub-display area 82 is set at, for example, the right bottom such that the center thereof deviates from that of the subject display area 80. The information image 57 is displayed in the information display area 81, and the subject image 55 is displayed in the sub-display area 82. Further, the subject display area 80 is not displayed.

Figure 13:
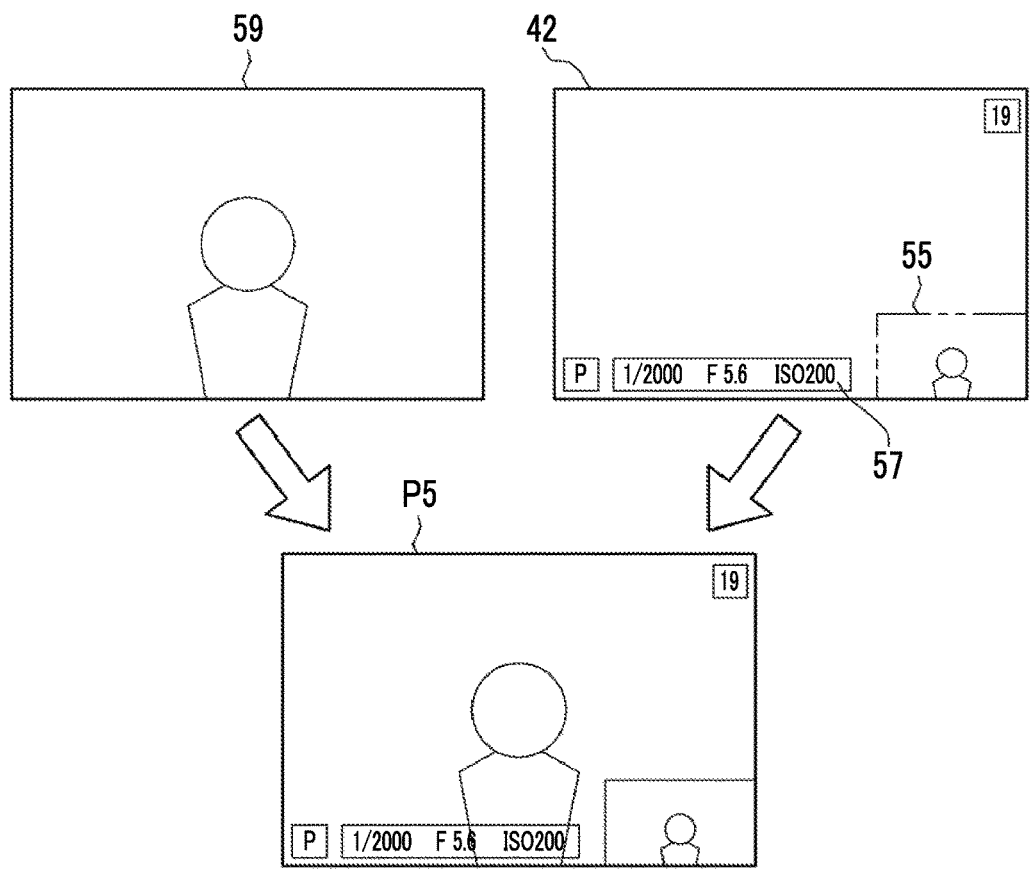
FIG. 13 is a diagram illustrating an example of a hybrid image in the hybrid mode.

As shown in FIG. 3, the information image 57 and the subject image 55 propagate on the second optical path 50, and are reflected by the half mirror 48. Further, since the OVF shutter 44 is set to the "opened state", the optical image 59 is transmitted through the OVF shutter 44, propagates on the first optical path 49, and is transmitted through the half mirror 48. As a result, as shown in FIG. 13, the hybrid image P5 in which the optical image 59, the information image 57, and the subject image 55 are superimposed is guided to the finder eyepiece section 16b. Further, the subject image 55 is displayed in the sub-display area 82, and is thus displayed to be close to the optical image 59. Instead of not displaying the subject display area 80, each of the angle-of-view frames 61 to 63 may be displayed in the subject display area 80 as in the first embodiment.

Further, also in the hybrid mode M5 of the third embodiment, the AF frame described in the first embodiment may be displayed. In this case, it is preferable that the AF frame is displayed in the subject display area 80, and the subject image corresponding to a part in the AF frame is displayed in the sub-display area 82 in an enlarged manner. Thereby, it is possible to check focusing on the basis of the image displayed in the sub-display area 82.

Fourth Embodiment

Figure 14:
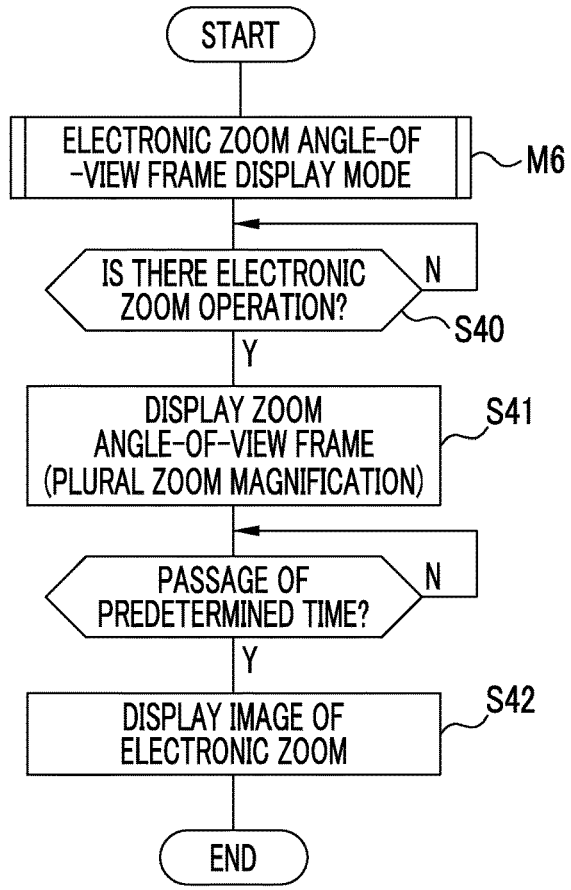
FIG. 14 is a flowchart illustrating processing in an electronic zoom angle-of-view frame display mode.
Figure 15:
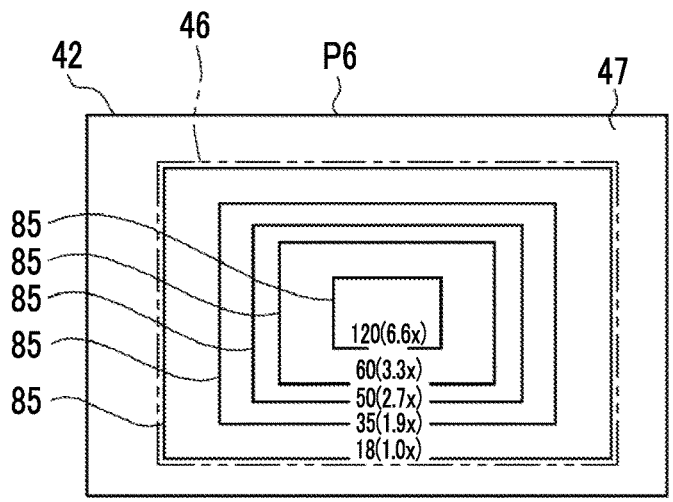
FIG. 15 is a diagram illustrating an example of an OVF image in the electronic zoom angle-of-view frame display mode.

As shown in FIGS. 14 and 15, in the fourth embodiment, in a case where an electronic zoom angle-of-view frame display mode M6 is selected in the OVF mode M2 (S40), an angle-of-view frame 85 corresponding to a plurality of angle of views according to the electronic zoom (digital zoom) function is displayed on an OVF image P6 (S41). Electronic zoom is a function of cutting out a region with a size, which corresponds to the electronic zoom magnification, from image data and enlarging the region. By pressing the release button in the electronic zoom state, it is possible to obtain image data of the region corresponding to the electronic zoom magnification.

The electronic zoom angle-of-view frame display mode M6 is set in a case where it is desired to display angle-of-view frames according to a plurality of electronic zooming operations before electronic zooming at the initial setting of the camera. For example, in a case where an electronic zoom magnification button is pressed in a state in which the electronic zoom angle-of-view frame display mode M6 is selected, as shown in FIG. 15, a zoom angle-of-view frame 85 is displayed, for example, for about 2 to 5 seconds before the electronic zooming is started. Therefore, by confirming the zoom angle-of-view frame 85 by the user, it becomes easy to select the angle-of-view frame on the basis of the optimum zoom magnification. Thereafter, in a case where the electronic zoom button is continuously pressed, the state is changed to the electronic zooming, and the display is switched from the display of the zoom angle-of-view frame 85 to the image display of the electronic zooming (S42).

In addition to the OVF mode M2, the electronic zoom angle-of-view frame display mode M6 may be performed in the EVF mode M1 or the hybrid mode M5.

[Modification]

Figure 16:
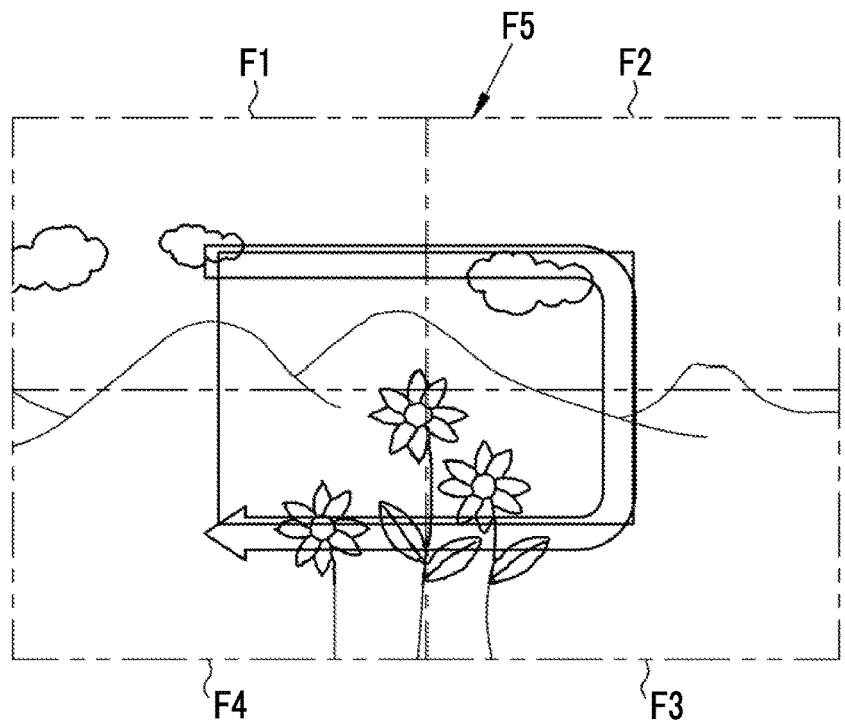
FIG. 16 is an explanatory diagram of a swing panoramic imaging method for capturing an image of an area greater than the angle of view of the imaging lens.

The image data, which is obtained by the solid-state imaging element 31, can be obtained only within the angle of view of the imaging lens 12 mounted on the mount section 13. Therefore, in the EVF mode M1, the subject image can not be displayed in an area greater than the angle of view of the mounted imaging lens 12. For this reason, even in a case where only the angle-of-view frame of the wide-angle imaging lens 12 is displayed, only the angle-of-view frame is displayed. Thus, it is difficult to imagine a specific imaging area of the wide-angle imaging lens 12. In order to compensate for this, in the modification example, as shown in FIG. 16, an image of an area, which is for example four times greater than the angle-of-view frame of the mounted imaging lens, is captured in accordance with the swing panoramic imaging method. The swing panoramic imaging method is well known, and a description of a method of acquiring images by moving the camera is omitted.

In the modification example, as shown in FIG. 16, the swing direction of the camera in the captured scene is set in U shape, and images F1 to F4 with the imaging angle of view of about 4 times are obtained. The swing direction of the camera may be any direction. For example, first, the camera is moved to the right side in the horizontal direction, then downward in the vertical direction, finally horizontally to the left side. As a result, images F1 to F4 of the respective parts are acquired. From these obtained images F1 to F4, these boundaries are extracted through, for example, pattern recognition, and the images F1 to F4 are connected at the boundary portion, whereby an image F5 with an imaging angle of view of about 4 times is acquired. In addition, the swing direction of the camera is first upward in the vertical direction, then rightward in the horizontal direction, and finally downward in the vertical direction. Thereby, image data that is long in the longitudinal direction may be acquired. Alternatively, a panoramic image, which is long in the horizontal direction, may be obtained by simply swinging the camera to the right side in the horizontal direction or the left side in the horizontal direction. Furthermore, a panoramic image, which is long in the vertical direction, may be obtained by swinging the camera to the upper side in the vertical direction or the lower side in the vertical direction.

Figure 17:
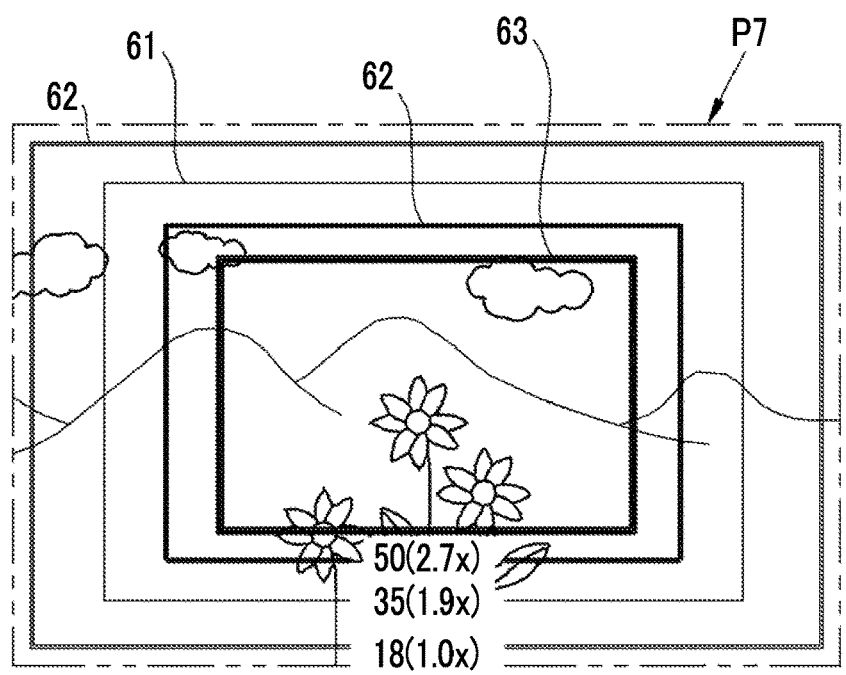
FIG. 17 is a diagram illustrating an example in which an angle-of-view frame is displayed on a panoramic image obtained by the swing panoramic imaging method.

The panoramic image P7 based on the image F5 obtained by the above swing panoramic imaging method is displayed in the EVF mode, in the hybrid mode, or at the time of display on the rear side display section 15 as shown in FIG. 17. In addition, the first to third angle-of-view frames 61 to 63 are displayed on the panoramic image P7 in the same manner as in the first embodiment. By displaying the first to third angle-of-view frames 61 to 63 in the panoramic image P7 obtained by the swing panoramic imaging method in such a manner, it becomes easy to find the imaging angle of view of each imaging lens 12.

In the above-mentioned embodiment, the present invention is applied to an imaging device in which a lens barrel is detachably mounted on a camera body. However, the present invention may be applied to an imaging device in which the lens barrel and the camera body are an integral type that can not be separated and conversion lenses having different focal lengths are detachably mounted on a lens barrel. In this case, the conversion lens corresponds to the imaging lens described in the claims, and the connecting portion of the conversion lens in the lens barrel corresponds to the mount section described in the claims.

Further, the present invention can be applied to not only a digital camera, but also imaging devices such as a video camera, a mobile phone, and a smartphone.

EXPLANATION OF REFERENCES

10: digital camera
11: camera body
12: imaging lens
13: mount section
16: finder
22: mode selection button
23: zoom button 31: solid state imaging element
32: main control section
38: second display control section
41: angle-of-view frame table data
42: EVFLCD
55: subject image
57: information Image
59: optical image
61: first angle-of-view frame
62: second angle-of-view frame
63: third angle-of-view frame
80: subject display area
81: information display area
82: sub-display area
85: zoom angle-of-view frame
M1: EVF mode
M2: OVF mode
M3: total-angle-of-view frame display mode
M4: scene determination optimum angle-of-view frame display mode
M5: hybrid mode
M6: electronic zoom angle-of-view frame display mode

What is claimed is:

1. An imaging device comprising:
a mount section on which a plurality of imaging lenses having different focal lengths are detachably mounted;
an imaging element that generates an image on the basis of a subject image incident through one of the imaging lenses mounted on the mount section;
a finder that is configured to be capable of observing the subject image through a finder lens;
a finder information display section that performs display so as to be capable of observing information in a state where the information is superimposed on the subject image, in the finder;
a mounting history storage section that stores a mounting history of the imaging lens previously mounted on the mount section;
a first angle-of-view frame display control section that controls the finder information display section such that the finder information display section displays, as the information, a plurality of first angle-of-view frames corresponding to the focal lengths of all the imaging lenses mountable on the mount section;
a second angle-of-view frame display control section that controls the finder information display section and sets one of the plurality of first angle-of-view frames, which corresponds to the focal length of the imaging lens previously mounted on the mount section, as a second angle-of-view frame on the basis of the mounting history, such that the finder information display section displays, as the information, the second angle-of-view frame in a display form different from a display form of the first angle-of-view frame; and
a third angle-of-view frame display control section controls the finder information display section such that the finder information display section displays, as the information, a third angle-of-view frame, which corresponds to the focal length of the imaging lens currently mounted on the mount section, in a display form different from the display forms of the first and second angle-of-view frames.

2. The imaging device according to claim 1, further comprising:
a determination section that determines an optimum focal length suitable for a captured scene of the image; and
a highlighting display control section that highlights an angle-of-view frame, which corresponds to the optimum focal length determined by the determination section, among the first to third angle-of-view frames.

3. The imaging device according to claim 2, wherein, in addition to the information, the finder information display section displays the image, which is generated by the imaging element, such that the image is superimposed on or is close to the subject image.

4. The imaging device according to claim 3, wherein the finder information display section displays an optimum angle-of-view frame, which corresponds to the optimum focal length determined by the determination section, in the image.

5. The imaging device according to claim 4, wherein the finder information display section lowers a luminance of a region other than the optimum angle-of-view frame in the image, and displays the region.

6. The imaging device according to claim 3,
wherein an electronic zoom function of cutting out a region having a size corresponding to an electronic zoom magnification from the image and enlarging the region is provided, and
wherein the finder information display section displays a plurality of angle-of-view frames corresponding to a plurality of electronic zoom magnifications in the image before the electronic zoom function is executed.

7. A control method of an imaging device including
a mount section on which a plurality of imaging lenses having different focal lengths are detachably mounted,
an imaging element that generates an image on the basis of a subject image incident through one of the imaging lenses mounted on the mount section,
a finder that is configured to be capable of observing the subject image through a finder lens, and
a finder information display section that performs display so as to be capable of observing information in a state where the information is superimposed on the subject image, in the finder,
the control method comprising:
a mounting history storing step of storing a mounting history of the imaging lens previously mounted on the mount section;
a first angle-of-view frame display control step of controlling the finder information display section such that the finder information display section displays, as the information, a plurality of first angle-of-view frames corresponding to the focal lengths of all the imaging lenses mountable on the mount section;
a second angle-of-view frame display control step of controlling the finder information display section and setting one of the plurality of first angle-of-view frames, which corresponds to the focal length of the imaging lens previously mounted on the mount section, as a second angle-of-view frame on the basis of the mounting history, such that the finder information display section displays, as the information, the second angle-of-view frame in a display form different from a display form of the first angle-of-view frame; and
a third angle-of-view frame display control step of controlling the finder information display section such that the finder information display section displays, as the information, a third angle-of-view frame, which corresponds to the focal length of the imaging lens currently mounted on the mount section, in a display form different from the display forms of the first and second angle-of-view frames.

* * * * *